(12) United States Patent
Russell

(10) Patent No.: US 9,332,165 B1
(45) Date of Patent: May 3, 2016

(54) ELECTRONIC DEVICE INCLUDING CAMERA MODULE UNTHREADED ENDS THAT SEALINGLY ENGAGE PRIOR TO THREADED ENDS ENGAGING AND RELATED METHODS

(71) Applicant: STMICROELECTRONICS (RESEARCH & DEVELOPMENT) LIMITED, Marlow Bucks (GB)

(72) Inventor: Alex Russell, Crossgates (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 17 days.

(21) Appl. No.: 14/586,236

(22) Filed: Dec. 30, 2014

(51) Int. Cl.
*H04N 5/225* (2006.01)
*G02B 13/00* (2006.01)

(52) U.S. Cl.
CPC .......... *H04N 5/2254* (2013.01); *G02B 13/0015* (2013.01)

(58) Field of Classification Search
CPC . H04N 5/2254; G02B 13/0015; A01B 12/006
See application file for complete search history.

(56) References Cited

U.S. PATENT DOCUMENTS

| 7,925,154 | B2 | 4/2011 | Ryu | |
|---|---|---|---|---|
| 8,680,634 | B2 | 3/2014 | Borthakur et al. | |
| 2008/0143871 | A1 | 6/2008 | Go | |
| 2010/0290770 | A1* | 11/2010 | Ishizuka | G03B 17/00 396/55 |
| 2011/0130177 | A1* | 6/2011 | Halliday | H01L 27/14618 455/575.1 |
| 2015/0029337 | A1* | 1/2015 | Uchiyama | H04N 5/2252 348/148 |

* cited by examiner

*Primary Examiner* — Tuan Ho
(74) *Attorney, Agent, or Firm* — Allen, Dyer, Doppelt, Milbrath & Gilchrist, P.A.

(57) ABSTRACT

A camera assembly may include a printed circuit board (PCB), an image sensor carried by the PCB, and a lens assembly carried by the PCB and having an external, enlarged diameter, threaded upper end, and an external, unthreaded lower end. The camera assembly may further include a camera body having a lens assembly opening aligned between the image sensor and the lens assembly. The lens assembly opening may have an internal, enlarged diameter, threaded upper end, and an internal unthreaded lower end. The external unthreaded lower end of the lens assembly may sealingly engage the internal, unthreaded lower end of the camera body prior to the external, enlarged diameter, threaded upper end of the lens assembly threadingly engaging the internal, enlarged diameter, threaded upper end of the camera body.

20 Claims, 2 Drawing Sheets

ELECTRONIC DEVICE INCLUDING CAMERA MODULE UNTHREADED ENDS THAT SEALINGLY ENGAGE PRIOR TO THREADED ENDS ENGAGING AND RELATED METHODS

FIELD OF THE INVENTION

The present invention relates to the field of electronics and, more particularly, to camera assemblies and related methods.

BACKGROUND OF THE INVENTION

It may be desirable for an electronic device, for example, a cellular telephone, to have increased functionality beyond wireless communications. For example, a mobile wireless communications device may have one or more input devices, such as a camera, for example, a digital camera.

In a digital camera that includes a relatively small image sensor, for example that may be found in an electronic device such as a cellular telephone, foreign material may significantly reduce image quality. For example, foreign material may fall within or gather in the image sensing area of the image sensor. Foreign material may also cause an increased amount of rejected cameras based upon failing to meet quality metrics.

Foreign material traps may be used to reduce foreign material that enters the image sensing area. However, these foreign material traps may not reduce or prevent foreign material from entering the image sensing area at early stages of manufacturing, for example. Accordingly, further improvements to reducing foreign material adjacent the image sensor or within the image sensing area may be desirable.

SUMMARY OF THE INVENTION

A camera assembly may include a printed circuit board (PCB), an image sensor carried by the PCB, and a lens assembly carried by the PCB and having an external, enlarged diameter, threaded upper end, and an external, unthreaded lower end. The camera assembly may further include a camera body having a lens assembly opening aligned between the image sensor and the lens assembly. The lens assembly opening may have an internal, enlarged diameter, threaded upper end, and an internal unthreaded lower end. The external unthreaded lower end of the lens assembly may sealingly engage the internal, unthreaded lower end of the camera body prior to the external, enlarged diameter, threaded upper end of the lens assembly threadingly engaging the internal, enlarged diameter, threaded upper end of the camera body. Accordingly, foreign materials that may interfere with the image sensor, such as, for example, foreign material that may be generated from focussing the lens, i.e., rotating the lens assembly in the camera body, may be reduced.

The external unthreaded lower end of the lens assembly may have a height that is greater than a height of the internal, enlarged diameter, threaded upper end of the camera body, for example. The external, enlarged diameter, threaded upper end of the lens assembly may have a height greater than a height of the internal, enlarged diameter, threaded upper end of the camera body.

The lens assembly may include a lens barrel and at least one lens carried by the lens barrel. The camera assembly may further include a light filter between the image sensor and the lens assembly, for example. The light filter may be an infrared (IR) light filter.

The image sensor may include an integrated circuit image sensor. The lens assembly may include plastic, for example.

A method aspect is directed to a method of making a camera assembly that includes a printed circuit board (PCB), an image sensor carried by the PCB, a lens assembly carried by the PCB and having an external, enlarged diameter, threaded upper end, and an external unthreaded lower end, and a camera body having a lens assembly opening aligned between the image sensor and the lens assembly. The lens assembly may have an opening having an internal, enlarged diameter, threaded upper end, and an internal unthreaded lower end. The method may include forming the lens assembly and the camera body so that the external unthreaded lower end of the lens assembly sealingly engages the internal, unthreaded lower end of the camera body prior to the external, enlarged diameter, threaded upper end of the lens assembly threadingly engaging the internal, enlarged diameter, threaded upper end of the camera body.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
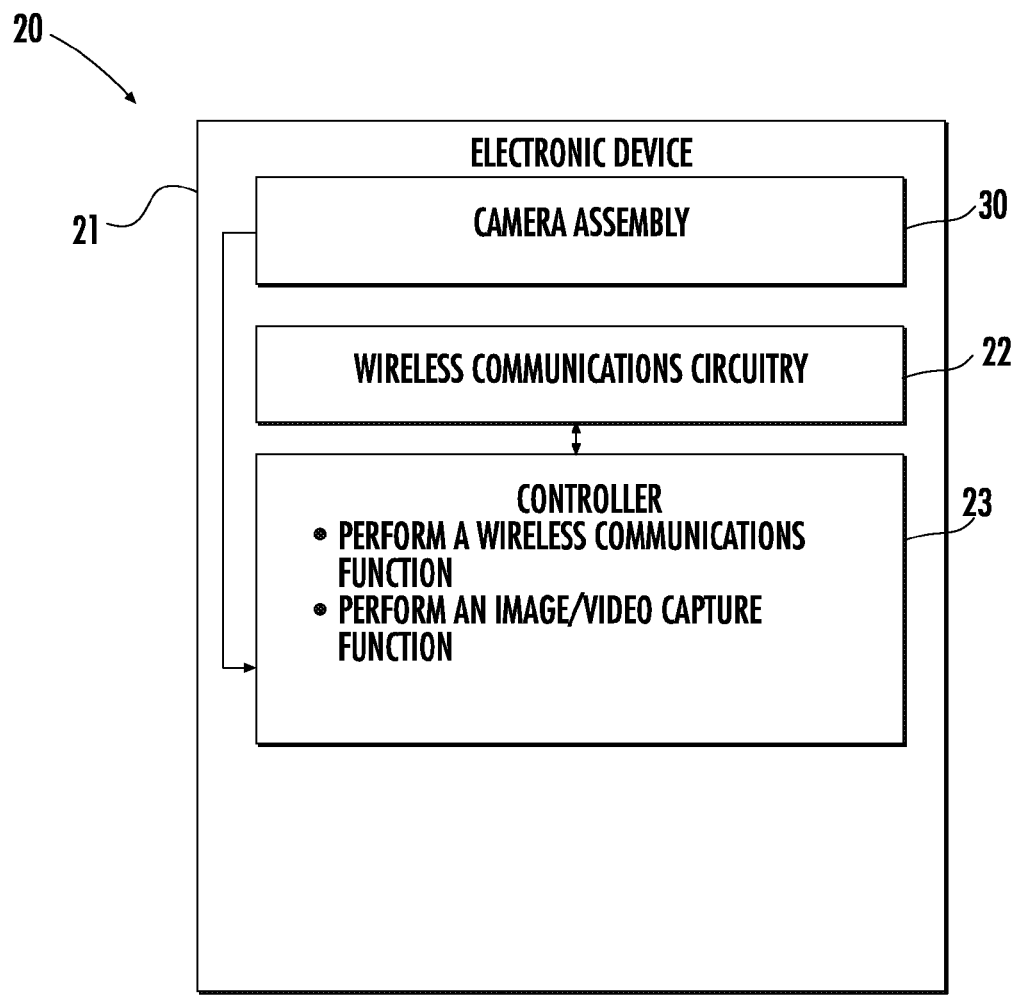
FIG. 1 is a schematic block diagram of an electronic device according to an embodiment.

Referring initially to FIG. 1, an electronic device 20 includes a housing 21 and wireless communications circuitry 22 carried by the housing. The electronic device 20 may be a cellular telephone, tablet computer, or electronic device, for example. A controller 23 is carried by the housing 21 and cooperates with the wireless communications circuitry 22 to perform a wireless communications function. The controller 23 may perform other and/or additional functions, for example, as will be described in further detail below.

Figure 2:
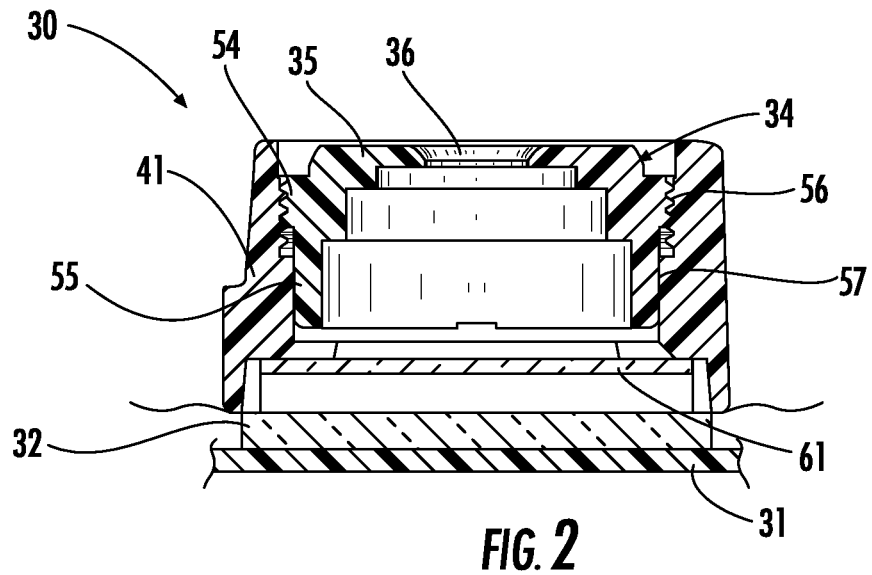
FIG. 2 is a cross-sectional view of the camera assembly of the electronic device of FIG. 1.
Figure 3:
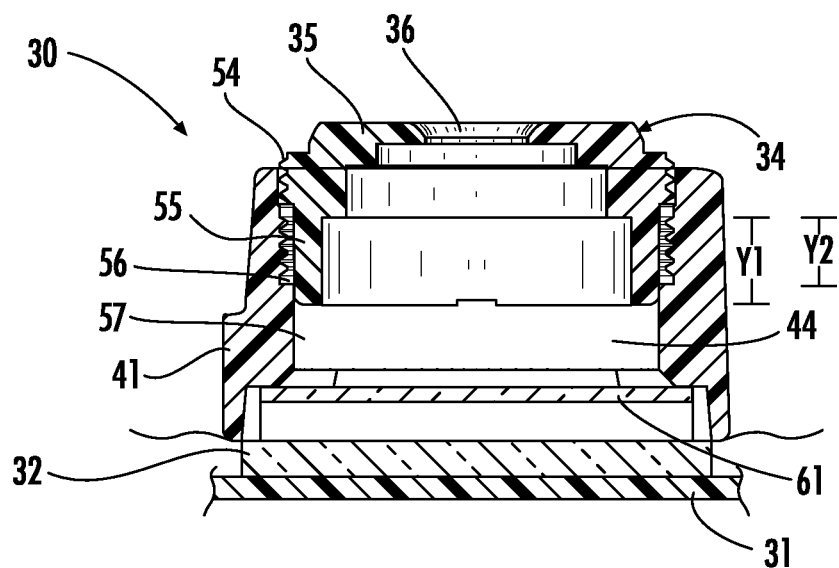
FIG. 3 is another cross-sectional view of the camera assembly of FIG. 2.

Referring now additionally to FIGS. 2-3, a camera assembly 30 is carried by the housing 21 and is coupled to the controller 23. The camera assembly 30 may cooperate with the controller 23 to perform image or video capture functions. The camera assembly 30 includes a printed circuit board (PCB) 31. An image sensor 32 is carried by the PCB 31. The image sensor 32 may be an integrated circuit image sensor, for example, a semiconductor image sensor, and more particularly, a complementary metal oxide semiconductor image sensor. Of course, the image sensor 32 may be another type of image sensor, as will be appreciated by those skilled in the art.

The camera assembly 30 also includes a lens assembly 34 carried by the PCB 31. The lens assembly 34 includes a lens barrel 35 and a lens 36. More than one lens may be included. The lens assembly 34 may include other and/or additional components, for example, an anti-reflective coating. The other and/or additional components may be based upon functionality, as will be appreciated by those skilled in the art. The lens assembly 34 may be plastic, for example. The lens assembly 34 may include other and/or additional material, for example, that may increase strength while maintaining a relatively light weight.

The lens assembly 34 has an external, enlarged diameter, threaded upper end 54 and an external unthreaded lower end 55. More particularly, it is the lens barrel 35 that includes the external, enlarged diameter, threaded upper end 54 and the external unthreaded lower end 55. It should be understood that the external, enlarged diameter, threaded upper end 54 is enlarged, i.e., has a larger diameter, relative to the external unthreaded lower end 55.

The camera assembly 30 further includes a camera body 41. The camera body 41 has a lens assembly opening 44 aligned between the image sensor 32 and the lens assembly 34. The lens assembly 34 is positioned within the lens assembly opening 44. The camera body 41 may be plastic, for example. The camera body 41 may include other and/or additional material, for example, that may increase strength while maintaining a relatively light weight.

The camera assembly 30 also illustratively includes a light filter 61 between the image sensor 32 and the lens assembly 34. The light filter 61 may be glass, for example, and may be an infrared (IR) light filter. Of course, the light filter 61 may be another type of filter and may include other and/or additional materials.

The lens assembly opening 44 has an internal, enlarged diameter, threaded upper end 56 and an internal unthreaded lower end 57. Similar to the lens assembly 34, it should be understood that the internal, enlarged diameter, threaded upper end 56 is enlarged, i.e., has a larger diameter, relative to the internal unthreaded lower end 57.

The external, enlarged diameter, threaded upper end 54 of the lens assembly 34 has a height greater than a height of the internal, enlarged diameter, threaded upper end 56 of the camera body 41. The different thread heights advantageously allow for the lens assembly 34 to be adjusted upwardly or downwardly from an as delivered position to a focused position.

The external unthreaded lower end 55 of the lens assembly 34 is sized so that it sealingly engages the an internal unthreaded lower end 57 of the camera body 41 prior to the external, enlarged diameter, threaded upper end 54 of the lens assembly 34 threadingly engaging the an internal, enlarged diameter, threaded upper end 56. Structurally, this sealing and threading engagement occurs as based upon the external unthreaded lower end 55 of the lens assembly 34 having a height Y1 that is greater than a height Y2 of the internal, enlarged diameter, threaded upper end 56 of the lens assembly opening 44.

As will be appreciated by those skilled in the art, during manufacture of the camera assembly 30, despite efforts to reduce foreign material, foreign material may be generated when the camera assembly 30 is configured for use, and in particular, when the lens assembly 34 is threadingly adjusted to the focused position. Foreign material is typically, during this adjustment, dislodged from the plastic by thread friction, for example. The foreign material often falls on an upper surface of the IR filter 61 in the line of sight of the image sensor 32, i.e., the image sensing area. The foreign material may be visible and can be attributed to image quality degradation, which is undesirable.

The camera module 30 described herein may be particularly advantageous for reducing the amount of foreign material that is in the image sensing area, especially during early stages of manufacture. In particular, the external unthreaded lower end 55 of the lens assembly 34 and the internal, enlarged diameter, threaded upper end 56 of the camera body 41 are advantageously sized so that the external unthreaded lower end 55 of the lens assembly seals the area above the light filter 61 and the image sensor 32 (i.e., the image sensing area) from foreign materials, prior to the engagement of the external, enlarged diameter, threaded upper end 54 of the lens assembly and the internal, enlarged diameter, threaded upper end of the camera body. Thus, any foreign materials that may result from threadable engagement are not permitted to enter the image sensing area.

A method aspect is directed to a method of making the camera assembly 30 that includes a PCB 31, an image sensor 32 carried by the PCB, a lens assembly 34 carried by the PCB and having an external, enlarged diameter, threaded upper end 54, and an external unthreaded lower end 55, and a camera body 41 having a lens assembly opening 44 aligned between the image sensor and the lens assembly. The lens assembly opening 44 has an internal, enlarged diameter, threaded upper end 56, and an internal unthreaded lower end 57. The method includes forming the lens assembly 34 and the camera body 41 so that the external unthreaded lower end 55 of the lens assembly sealingly engages the internal, unthreaded lower end 57 of the camera body prior to the external, enlarged diameter, threaded upper end 54 of the lens assembly threadingly engaging the internal, enlarged diameter, threaded upper end 56 of the camera body.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A camera assembly comprising:
a printed circuit board (PCB);
an image sensor carried by said PCB;
a lens assembly carried by said PCB and having an external, enlarged diameter, threaded upper end, and an external unthreaded lower end; and
a camera body having a lens assembly opening aligned between said image sensor and said lens assembly, the lens assembly opening having an internal, enlarged diameter, threaded upper end, and an internal unthreaded lower end;
the external unthreaded lower end of said lens assembly sealingly engaging the internal, unthreaded lower end of said camera body prior to the external, enlarged diameter, threaded upper end of said lens assembly threadingly engaging the internal, enlarged diameter, threaded upper end of said camera body.

2. The camera assembly of claim 1, wherein the external unthreaded lower end of said lens assembly has a height that is greater than a height of the internal, enlarged diameter, threaded upper end of said camera body.

3. The camera assembly of claim 1, wherein the external, enlarged diameter, threaded upper end of said lens assembly has a height greater than a height of the internal, enlarged diameter, threaded upper end of said camera body.

4. The camera assembly of claim 1, wherein said lens assembly comprises a lens barrel and at least one lens carried by said lens barrel.

5. The camera assembly of claim 1, further comprising a light filter between said image sensor and said lens assembly.

6. The camera assembly of claim 5, wherein said light filter comprises in infrared (IR) light filter.

7. The camera assembly of claim 1, wherein said image sensor comprises an integrated circuit image sensor.

8. The camera assembly of claim 1, wherein said lens assembly comprises plastic.

9. An electronic device comprising:
- a housing;
- wireless communications circuitry carried by said housing;
- a camera assembly comprising
  - a printed circuit board (PCB);
  - an image sensor carried by said PCB;
  - a lens assembly carried by said PCB and having an external, enlarged diameter, threaded upper end, and an external unthreaded lower end; and
  - a camera body having a lens assembly opening aligned between said image sensor and said lens assembly, the lens assembly opening having an internal, enlarged diameter, threaded upper end, and an internal unthreaded lower end;
  - the external unthreaded lower end of said lens assembly sealingly engaging the internal, unthreaded lower end of said camera body prior to the external, enlarged diameter, threaded upper end of said lens assembly threadingly engaging the internal, enlarged diameter, threaded upper end of said camera body; and
  - a controller coupled to said wireless communications circuitry and said camera module.

10. The electronic device of claim 9, wherein the external unthreaded lower end of said lens assembly has a height that is greater than a height of the internal, enlarged diameter, threaded upper end of said camera body.

11. The electronic device of claim 9, wherein the external, enlarged diameter, threaded upper end of said lens assembly has a height greater than a height of the internal, enlarged diameter, threaded upper end of said camera body.

12. The electronic device of claim 9, wherein said lens assembly comprises a lens barrel and at least one lens carried by said lens barrel.

13. The electronic device of claim 9, wherein said camera assembly further comprises a light filter between said image sensor and said lens assembly.

14. A method of making a camera assembly comprising a printed circuit board (PCB), an image sensor carried by the PCB, a lens assembly carried by the PCB and having an external, enlarged diameter, threaded upper end, and an external unthreaded lower end, and a camera body having a lens assembly opening aligned between the image sensor and the lens assembly, the lens assembly opening having an internal, enlarged diameter, threaded upper end, and an internal unthreaded lower end, the method comprising:
- forming the lens assembly and the camera body so that the external unthreaded lower end of the lens assembly sealingly engages the internal, unthreaded lower end of the camera body prior to the external, enlarged diameter, threaded upper end of the lens assembly threadingly engaging the internal, enlarged diameter, threaded upper end of the camera body.

15. The method of claim 14, wherein the lens assembly and the camera body are formed so that the external unthreaded lower end of the lens assembly has a height that is greater than a height of the internal, enlarged diameter, threaded upper end of the camera body.

16. The method of claim 14, wherein the lens assembly and the camera body are formed so that the external, enlarged diameter, threaded upper end of the lens assembly has a height greater than a height of the internal, enlarged diameter, threaded upper end of the camera body.

17. The method of claim 14, wherein the lens assembly comprises a lens barrel and at least one lens carried by the lens barrel.

18. The method of claim 14, further comprising positioning a light filter between the image sensor and the lens assembly.

19. The method of claim 18, wherein the light filter comprises in infrared (IR) light filter.

20. The method of claim 14, wherein the image sensor comprises an integrated circuit image sensor.

* * * * *